United States Patent Office 2,981,701
Patented Apr. 25, 1961

2,981,701
CURABLE ALIPHATIC POLYEPOXIDE COMPOSITIONS

William E. St. Clair, Pittsburgh, and Roy H. Moult, Butler, Pa., assignors to Koppers Company, Inc., a corporation of Delaware No Drawing. Filed Jan. 13, 1958, Ser. No. 708,407

5 Claims. (Cl. 260—18)

This invention relates to compositions which cure at room temperature to tough infusible resinous materials which are resistant to attack by moisture, high temperature, solvents and chemicals and are useful as adhesives, coatings, casting resins, potting compounds for electrical circuit components and the like.

It is known that epoxy resins can be cured with liquid amines at room temperature. However, the cross-linking reaction between the amines and the epoxy compounds is so rapid that the pot lives after the material is mixed has been too short for practical use. By pot life is meant the useful life of the mixture of a component during which the product is capable of being used or applied after the mixing.

It has now been discovered that when an aliphatic polyepoxide and a solid polyamine or a polyamide prepared from an alkylene diamine and a fatty acid are used, a composition having an extended pot life can be prepared. It is postulated that the reaction rate is controlled by the lower rate of availability of the amine due to the controlling rate the solubility slows the speed of curing the reaction sufficiently to give this extended pot life.

The compositions of this invention comprise mixtures of liquid aliphatic polyepoxides and solid polyamine curing agents.

The compositions of this invention are particularly useful as adhesives for joining materials, such as wood, glass, metals, rubber, plastics (except for polymers presenting non-polar surfaces such as polyethylene, Teflon, and Kel-F), textiles, such as nylon, cotton, asbestos, glass-fiber, rayon, synthetics, etc., and mixtures or combinations of the above. At room temperatures, these compositions will bond together all materials presenting polar surfaces to give high adhesive and coadhesive strengths. In fact, the strength of the bond provided by the adhesive compositions of this invention is greater than the strength of the bonded material; when wood is so bonded to wood, metal, glass or rubber and subjected to stress, it is quite common to get substantially complete failure of the wood with no failure of the adhesive composition or, if the wood is stronger than the other substrate, such as when rubber or textiles are used, then 100% failure of the rubber or textile results or part of each substrate may fail, but essentially there is no adhesive failure. With metal to metal bonds a measure of the true adhesive and cohesive strength of the bond line can be made because in this type of bonding the adhesive ruptures under stress. Thus, all subsequent examples are reported as tensile shear strengths of metal to metal bonds, but it is to be understood that this is in no way to be constructed as limiting the scope of the invention. The adhesives formed from the compositions of this invention show excellent tensile shear strength at low temperature, e. g. —67° F. In addition they have unusually high resistance to attack by moisture, salt water, solvents, chemicals, alkalies, acids and excellent resistance to heat and breakdown under electrical load. In fact, so far as can be determined the novel composition is, after curing, insoluble in every common solvent.

Representative aliphatic polyepoxides useful to the present invention include: butadiene dioxide, isoprene dioxide, hexadiene dioxide, hexatriene trioxide, and dipropyl ether dioxide.

Useful as curing agents in the compositions in the present invention are solid polyamines of the class of aliphatic, mononuclear aromatic, polynuclear aromatic, condensed polynuclear aromatic, and heterocyclic compounds (polyamines being those compounds of such classes wherein the compounds contain two or more nitrogen atoms having attached thereto one or more hydrogen atoms, termed "amine hydrogen," available for reaction with the oxirane oxygen of the aliphatic polyepoxide). The concentration of polyamine in the composition is advantageously within the range of 0.8 to 1.4 equivalents of amine hydrogen per equivalent of oxirane-oxygen in the aliphatic polyepoxide. Representative solid aliphatic polyamine compounds are 1,6- hexanediamine; 1,10 decanediamine; and 1,18 octadecanediamine; representative mononuclear polyamines are o-, m-, or p-phenylenediamine; 2,4′, 3,4′, or 2,5 toluenediamine; N,N′ diphenyl p-phenylenediamine; N,N′ di-2-naphthyl-p-phenylenediamine; diaminophenol; diaminophenol-HC 1,2,4 diaminoanisol; and 4 methoxy-6-methyl-m-phenylenediamine; representative aromatic polynuclear polyamines are benzidene; 2,4 diamino azobenzene; N,N′ diphenylethylenediamine; 4,4′ diaminodiphenylsulfone; 2,2′ diamino 4,4′ dinitrodiphenylmethane; p,p′ methylenediamiline; and 4,4′4″ triphenylmethane; representative aromatic condensed polynuclear amines are 2,3; 1,8,1,5 diaminonaphthalene, 1,4 diamino anthraquinone, and 1,3 diamino dihydro-anthraquinone; and representative heterocyclic polyamines are 2,6 diaminopyridine, 2,4 diamino-6-hydroxy pyrimidine, and 3,6 diamino-9-methyl carbazole.

A plasticizer is advantageously added to the composition where flexibility is desired of the novel composition and where the bond is subject to low temperatures. A plasticizer also aids in dispersing the solid polyamine in the aliphatic polyepoxide. Further, when the polyamine is in the form of a finely divided solid polyamine, the polyamine can be mixed directly into the aliphatic polyepoxide; but since solid polyamines are not always commercially available as finely divided solids but are frequently of a coarse crystalline nature; it is advantageous in these instances to grind or mill the polyamine with the plasticizer and add this as a paste to liquid aliphatic polyepoxide.

Plasticizers and modifiers useful in the compositions of this invention include common inert organic esters, advantageously used to the extent of not more than about 10 parts per 100 parts based on the weight of the aliphatic polyepoxide, such as dioctyl phthalate, dibutyl maleate, butyl stearate, octyl acrylate, methyl acetyl ricinoleate, and tricresyl phosphate. Also advantageously used to the extent of about 20 parts per 100 parts of aliphatic polyepoxide are amides such as dicyandiamide, both the ortho and para toluene sulfonamides, n-cyclohexyl p-toluene sulfonamide, and acrylamide. Also useful to the extent of about 40 parts per 100 parts by weight of aliphatic polyepoxide are mono-functional epoxy compounds such as butyl epoxy stearate, butyl hydroxy acetoxy stearate, epoxy acetoxy stearin (triglyceride), isobutyl epoxy acetoxy stearate, and butyl polyacetoxy stearate. These materials, however, being mono-functional, act as chain stoppers and reduce the molecular weight of the cured resin. These mono-functional epoxy compounds can, if desired, be pre-reacted with sufficient liquid or solid mono- or poly-functional amines to form an amine product, and this product used as a plasticizer or inert solvent. With this product type of plasticizer, it is useful to mix sufficient solid polyamine agent with the monofunctional epoxy compound to react with all the oxirane oxygen in the compound still leaving enough additional amine hydrogen to react with the oxirane oxygen in the aliphatic polyepoxide composition with which it is to be the plasticizer.

Inert solvents may be added in small amounts, as desired, for viscosity control, particularly when the composition is to be used as a coating. These include aromatics, esters, alcohols, ketones, and mixtures thereof. Typical inert solvents advantageously added to the extent of about 20 parts per 100 parts based on the weight of aliphatic polyepoxide when the composition is to be as an adhesive are toluene, xylene, n-butylacetate, Cellosolve acetate, ethyl ether, n-butyl alcohol, acetone and methyl ethyl ketone. However when the composition is to be used as a coating solvent, 50% of the total weight of solids can be used. Also useful are active mono-epoxide solvents such as styrene oxide, benzylethylene oxide, butylene oxide, diisobutylene oxide, phenyl glycidyl ether, and alkyl glycidyl ether, although these epoxide solvents also act as chain stoppers as discussed above.

Inert fillers may also be added. Suitable fillers such as mica, alumina, asbestos and asbestine, ground, powdered or flaked glass, metal dust, celite, and clays up to the spreadable limits of the adhesive can be added. Advantageously up to 100 parts inert filler based on the weight of aliphatic polyepoxide can be used. With certain mixtures containing liquid plasticizers which aid in reducing the viscosity, larger amounts, such as 200–300 parts filler per 100 parts of aliphatic polyepoxide have been used. The limit, of course, depends to a large extent on the fineness of the filler and its absorption qualities.

While the invention has been described with particular embodiments as shown in the following examples, it will be understood that these are in no way limiting and that in its broadest aspects the invention may be variously embodied within the scope of the compositions as set forth herein and in the appended claims.

The following examples illustrate adhesives prepared in accordance with the present invention, the parts being parts by weight:

*Example I*

| | |
|---|---|
| Butadiene dioxide parts | 100 |
| Versamid 115 (polyamide from ethylene diamine and di-linoleic acid) parts | 100 |
| Pot life, hr do | 2½ |
| Strength, room temperature p.s.i | 2,565 |
| Strength, 180° F p.s.i | 1,895 |

*Example II*

| | |
|---|---|
| Butadiene dioxide parts | 100 |
| Versamid 115 do | 100 |
| 2,4 toluenediamine do | 62.6 |
| Pot life, hr do | 2¼ |
| Strength, room temperature p.s.i | 1,555 |
| Strength, 180° F p.s.i | 535 |

The tensile strength of the compositions of Examples I and II are indicated after 168 hours' cure at room temperature. The adhesive is coated on strips of aluminum sheet (previously cleaned) and two adhesive-coated strips are lapped a predetermined distance (½"). The lap joints are pressed at room temperature for 168 hours and tested for tensile shear strength.

The adhesives of Examples I and II show excellent tensile shear strength at low temperature, e.g. −67° F. The adhesives additionally show excellent resistance to attack by moisture, salt spray and solvents.

The following table illustrates other formulations using one equivalent of amine and one equivalent of butadiene dioxide with Thiokol LP-8 as a plasticizer in the ratio of one part of plasticizer for one part of the butadiene-amine composition:

| Line number | Formulation number | Curing Agent | Pot life, hr. | Room temp., p.s.i. | 180° F., p.s.i. |
|---|---|---|---|---|---|
| Example: | | | | | |
| III | 1119 | o-Phenylene diamine | 58.3 | 1,150 | 735 |
| IV | 1121 | Triethylenetetramine | 52.6 | 735 | 500 |
| V | 1123 | m-Phenylenediamine | 58.3 | 705 | 1,170 |
| VI | 1128 | 2,4 toluenediamine | 66.0 | 1,160 | 965 |
| VII | 1129 | 3,6 diamino-9-methyl carbazole | 119.0 | 745 | 510 |
| VIII | 1130 | 4,4 diaminodiphenyl sulfone | 134.6 | 10 | 15 |
| IX | 1131 | 2,4' diaminoazobenzene | 114.6 | 505 | 110 |
| X | 1132 | 2,6 diaminopyridine | 59 | 1,025 | 735 |
| XI | 1133 | 2,3 diaminonaphthalene | 86.3 | 335 | 160 |

What is claimed is:

1. A composition which cures at room temperature to an insoluble, infusible, resinous material that is resistant to attack by moisture, high temperature, solvents, chemicals, and that is useful as an adhesive coating or casting compound, comprising an aliphatic polyepoxide having from 4–6 carbon atoms and a curing agent selected from the group consisting of solid aromatic polyamines and solid polyamides that are the condensation product of ethylene diamine and fatty acids, said agent containing two or more nitrogen atoms each of which has attached thereto one or more hydrogen atoms for reaction with the oxirane oxygen of said polyepoxide, the ratio of said polyepoxide and said curing agent being such as to provide .8 to 1.4 equivalents of hydrogen per equivalent of oxirane oxygen in said aliphatic polyepoxide.

2. The composition set forth in claim 1, including a plasticizer.

3. The composition set forth in claim 1, including an inert solvent.

4. The composition set forth in claim 1, including an inert filler.

5. The composition set forth in claim 1 wherein said curing agent is 2,4 toluene diamine.

References Cited in the file of this patent

UNITED STATES PATENTS

| | | |
|---|---|---|
| 2,136,928 | Schlack | Nov. 15, 1938 |
| 2,500,600 | Bradley | Mar. 14, 1950 |
| 2,682,515 | Naps | June 29, 1954 |
| 2,705,223 | Renfrew et al. | Mar. 29, 1955 |
| 2,712,535 | Fisch | July 5, 1955 |
| 2,801,229 | De Hoff et al. | July 30, 1957 |
| 2,824,082 | Newey | Feb. 18, 1958 |
| 2,826,556 | Greenspan et al. | Mar. 11, 1958 |
| 2,829,984 | Yaeger | Apr. 8, 1958 |
| 2,867,592 | Morris et al. | Jan. 6, 1959 |
| 2,935,488 | Phillips et al. | May 3, 1960 |